(12) United States Patent
Abramov (10) Patent No.: US 9,743,077 B2
(45) Date of Patent: Aug. 22, 2017

(54) DETECTION AND MARKING OF LOW QUALITY VIDEO CONTENT

(71) Applicant: ECHOSTAR TECHNOLOGIES L.L.C., Englewood, CO (US)

(72) Inventor: Andrey L. Abramov, Foster City, CA (US)

(73) Assignee: Sling Media LLC, Foster City, CA (US)

(*) Notice: Subject to any disclaimer, the term of this patent is extended or adjusted under 35 U.S.C. 154(b) by 0 days.

(21) Appl. No.: 14/993,252

(22) Filed: Jan. 12, 2016

(65) Prior Publication Data

US 2017/0201745 A1 Jul. 13, 2017

(51) Int. Cl.
  *H04N 17/00* (2006.01)
  *G06K 9/60* (2006.01)
  *G06K 9/03* (2006.01)

(52) U.S. Cl.
  CPC .......... *H04N 17/002* (2013.01); *G06K 9/036* (2013.01); *G06K 9/60* (2013.01)

(58) Field of Classification Search
  CPC ......... H04N 17/002; G06K 9/036; G06K 9/60
  See application file for complete search history.

(56) References Cited

U.S. PATENT DOCUMENTS

| 2006/0153541 | A1* | 7/2006 | Dumont | H04N 9/7921 |
|---|---|---|---|---|
| | | | | 386/326 |
| 2008/0313278 | A1* | 12/2008 | Hochberg | H04N 21/23438 |
| | | | | 709/204 |
| 2013/0179588 | A1* | 7/2013 | McCarthy | H04N 21/23418 |
| | | | | 709/231 |
| 2013/0314511 | A1 | 11/2013 | Chen et al. | |
| 2014/0152849 | A1* | 6/2014 | Bala | G06T 3/4092 |
| | | | | 348/207.1 |

FOREIGN PATENT DOCUMENTS

WO 2015179021 A1 11/2015

OTHER PUBLICATIONS

European Patent Office International Searching Authority, International Search Report and Writte Opinion for International Application No. PCT/US2017/012849 dated Apr. 11, 2017.

* cited by examiner

*Primary Examiner* — Michael Teitelbaum
(74) *Attorney, Agent, or Firm* — LK Global (57) ABSTRACT

A mobile electronic device and a related method of processing video information are presented herein. In accordance with an exemplary embodiment, the method of processing video information captures video data with a source device, and determines that a segment of video content conveyed by the video data does not satisfy predetermined video quality criteria. In response to the determination, the method initiates corrective action to disregard the segment of video content.

10 Claims, 4 Drawing Sheets

DETECTION AND MARKING OF LOW QUALITY VIDEO CONTENT

TECHNICAL FIELD

Embodiments of the subject matter described herein relate generally to video systems and related video processing techniques. More particularly, embodiments of the subject matter relate to techniques and technologies for detecting when captured video content is of poor quality.

BACKGROUND

Video systems, video cameras, mobile devices with integrated video capturing and processing features, and video processing techniques and technologies are well known. Many portable electronic devices marketed to consumers include cameras and related video capturing, processing, and playback functions. For example, smartphones, tablet computer devices, portable video game devices, laptop computer devices, and devoted camera devices are now in widespread use. Consequently, many amateur photographers and videographers frequently capture images and video clips due to the convenience and availability of such portable devices (in particular, mobile phones).

The quality of video clips can vary, depending on the subject matter, the environmental conditions, the experience of the user, the care taken during video capture, the device settings utilized during video capture, and other factors. Ideally, video clips are captured with a steady hand, good lighting, and appropriate video capture settings. In reality, however, many video clips of poor or substandard quality are captured on a day to day basis. For example, video clips can be captured when the user mistakenly presses the record button. As another example, a poor quality video clip can be captured if the user accidentally drops the video capture device or moves the device too abruptly. As yet another example, improper device settings can result in poor image quality.

Accordingly, it is desirable to have systems and methodologies that can detect poor quality video content (during post-processing or while the video is being captured). Furthermore, other desirable features and characteristics will become apparent from the subsequent detailed description and the appended claims, taken in conjunction with the accompanying drawings and the foregoing technical field and background.

BRIEF SUMMARY

A method of processing video information involves: obtaining video data captured by a source device; analyzing sensor data generated by the source device, the video data, or both; determining a video content quality metric based on the analyzing; and saving the video content quality metric in association with the video data.

Another method of processing video information involves: capturing video data by a source device; determining that a segment of video content conveyed by the video data does not satisfy predetermined video quality criteria; and in response to the determining, initiating corrective action to disregard the segment of video content.

A mobile electronic device according to an embodiment includes: a camera configured to capture video data; a processor component; and a computer storage medium operatively associated with the processor component, the computer storage medium storing executable instructions. The instructions, when executed by the processor, cause the processor to: analyze the video data, sensor data generated by at least one sensor onboard the mobile electronic device or elsewhere, or both; determine that a segment of video content conveyed by the video data does not satisfy predetermined video quality criteria; and in response to the determining, initiate corrective action associated with the segment of video content.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software, firmware, or the like, various elements of the systems described herein are essentially the code segments or instructions that perform various tasks. In certain embodiments, the program or code segments are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like. These, and other types of storage media suitable for storing processor-executable instructions can be utilized by the devices and systems described herein.

The subject matter described herein relates to the processing of captured video data in a way that detects when the captured video content is of low quality, substandard quality, unusable, overly distorted, or the like. In accordance with certain embodiments, the analysis and processing of the video data is performed internally by the same electronic device that captures the video data. In accordance with some embodiments, the analysis and processing of the video data is performed by a video processing system or component that communicates with the source device that captures the video. For example, the source device can record and transmit (or stream) video content to a cloud-based video processing system, which then analyzes the video content to detect poor quality video segments. The analysis and processing of the video data can be performed in real-time or near real-time as soon as the video data is captured (e.g., for streaming applications), or it can be performed in a time-delayed manner at an appropriate time after the video data is captured (e.g., for post-processing application).

When a segment of poor quality video is detected, the system responds in an appropriate manner. In certain situations, corrective action is initiated at the video capture device. In other situations, the video data is marked or otherwise modified to identify the low quality video segment. In yet other situations, the video processing system can be operated in a way that mitigates the effect of undesirable video segments. The actions taken in response to the detection of poor quality video segments can be associated with the functionality of the video capture device, the video processing device, the video presentation device, and/or any combination of these devices. Additional details and examples are provided in the following description.

Figure 1:
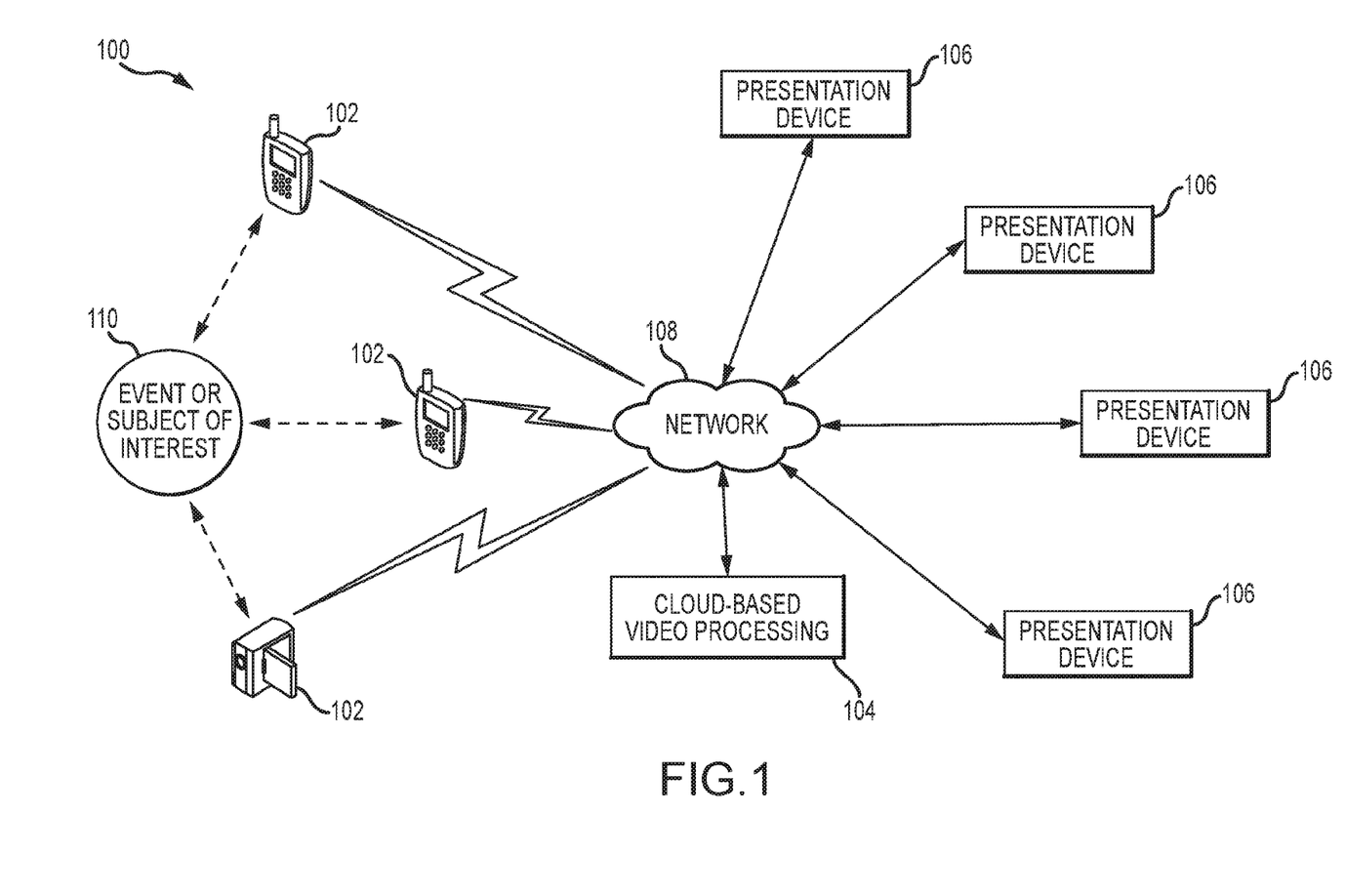
FIG. 1 is a block diagram that represents an exemplary embodiment of a video capturing and processing system environment.

FIG. 1 is a block diagram that represents an exemplary embodiment of a video capturing and processing system environment 100. The techniques and methodologies described with reference to the system environment 100 can also be implemented in the context of other system architectures and environments. The system environment 100 described here represents one practical scenario that can benefit from the video quality detection techniques presented herein. The system environment 100 generally includes, without limitation: one or more source devices 102 that can capture video data; a cloud-based video processing system 104; and one or more presentation devices 106 that can be operated to present video content. The devices supported by the system environment 100 can communicate with one another as needed via a data communication network 108.

Although only three source devices 102 are shown in FIG. 1, an embodiment of the system environment 100 can support any number of source devices 102. similarly, although only four presentation devices 106 are shown in FIG. 1, the system environment 100 can support any number of presentation devices 106. Each of the devices 102, 106 supported by the system environment 100 may be implemented using any suitable hardware platform. In this regard, a device 102, 106 can be realized in any common form factor including, without limitation: a desktop computer; a mobile computer (e.g., a tablet computer, a laptop computer, or a netbook computer); a smartphone; a video game device; a digital media player; a piece of home entertainment equipment; a digital camera or video camera; or the like. Each device 102, 106 supported by the system environment 100 is realized as a computer-implemented or computer-based device having the hardware, software, firmware, and/or processing logic needed to carry out the various techniques and methodologies described in more detail herein.

The video processing system 104 can be deployed in certain embodiments of the system environment 100 to analyze and process the video data captured by the source devices 102. In such embodiments, the video processing system 104 includes the functionality to determine when the captured video data contains video content of low or undesirable quality. The video processing system 104 may also be suitably configured to deliver video data to the presentation devices 106. Moreover, the video processing system 104 can be utilized to deliver video data to the source devices 102. In this regard, the video processing system 104 can receive the captured video data, process and/or manipulate the captured video data as needed, and return the processed (edited) version to the source devices 102 in real-time or at any convenient time.

In practice, the video processing system 104 may be realized as a computer-implemented or computer-based system having the hardware, software, firmware, and/or processing logic needed to carry out the various processes, techniques, and methodologies described in more detail herein. It should be appreciated that the video processing system 104 need not be deployed in embodiments where the source devices 102 and/or the presentation devices 106 perform the desired video analysis functionality. In other words, the methodology described herein could be implemented at the local client device level without relying on any centralized processing at the server level. Moreover, in certain embodiments the desired functionality could be executed or performed in a distributed manner across the video processing system 104 and one or more of the devices 102, 106.

The data communication network 108 provides and supports data connectivity between the devices 102, 106 and the video processing system 104. In practice, the data communication network 108 may be any digital or other communications network capable of transmitting messages or data between devices, systems, or components. In certain embodiments, the data communication network 108 includes a packet switched network that facilitates packet-based data communication, addressing, and data routing. The packet switched network could be, for example, a wide area network, the Internet, or the like. In various embodiments, the data communication network 108 includes any number of public or private data connections, links or network connections supporting any number of communications protocols. The data communication network 108 may include the Internet, for example, or any other network based upon TCP/IP or other conventional protocols. In various embodiments, the data communication network 108 could also incorporate a wireless and/or wired telephone network, such as a cellular communications network for communicating with mobile phones, personal digital assistants, and/or the like. The data communication network 108 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol.

In accordance with one contemplated use case, one or more of the source devices 102 can be operated to capture video of an event or subject of interest 110. Although not always required, this example assumes that all of the source devices 102 can obtain video data that captures the same event or subject of interest 110. A source device 102 can be suitably configured to wirelessly transmit the captured video data to a destination device or system, such as the video processing system 104 or any of the presentation devices 106. In certain embodiments, the source device 102 streams the captured video data in real-time or near real-time for processing and playback at the presentation devices 106, or for processing at the video processing system 104. The transmitted video data can be analyzed, processed, edited, formatted, and/or arranged as needed by the source device 102, the video processing system 104 and/or the presentation device 106.

In accordance with one operating scenario, the original captured video data is analyzed and processed by the capturing source device 102. The source device 102 detects whether or not the captured video data is of poor quality and, if so, takes appropriate action. For example, if a poor quality video segment is detected, then capturing/recording of the video data can be suspended until the source device 102 determines that the quality has improved. As another example, if a poor quality video segment is detected, then transmission/streaming of the video data can be suspended until the source device determines that the quality has improved. This feature can be highly desirable in practical situations where wireless bandwidth or mobile data allocation is limited.

Figure 2:
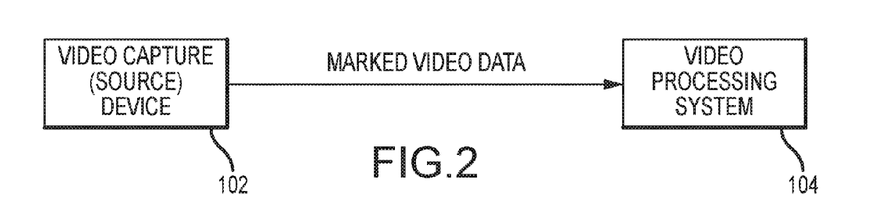
FIGS. 2-4 are block diagrams that illustrate different methodologies for transferring video data from a source device to a video processing device.

In another operating scenario, the source device can mark or flag segments of the captured video data that are of poor or undesirable quality. The marked or flagged video data can be transmitted to the video processing system 104 and/or to a presentation device 106 for further handling. In this regard, the destination component can review the video data, identify the marked or flagged segments, and take appropriate corrective action. For example, the destination component can send control instructions back to the source device 102, wherein the control instructions cause the source device 102 to suspend capturing, suspend transmission of the video data, or the like. FIG. 2 is a diagram that illustrates this scenario. In FIG. 2, a source device 102 transmits the marked video data to the video processing system 104 for handling.

Figure 3:
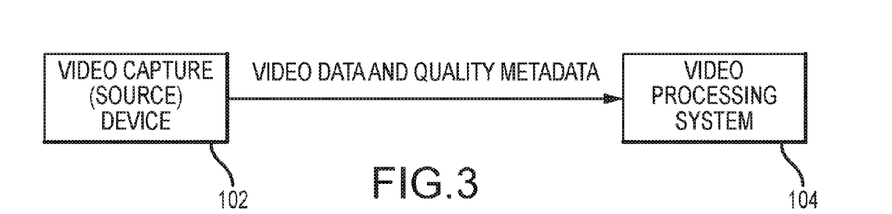

In accordance with another operating scenario, the source device 102 generates and saves metadata associated with the captured video data, wherein the metadata includes or defines a video quality metric or measurement. The video quality metric can be a score, a value, a quantifier, or a variable that indicates whether the corresponding video data is of low quality. FIG. 3 is a diagram that illustrates this scenario. In FIG. 3, a source device 102 transmits the captured video data in association with metadata that represents the video quality metric for the captured video data. The metadata can be integrated with the captured video data or it can be provided in a form that is separate and distinct from the captured video data.

Figure 4:
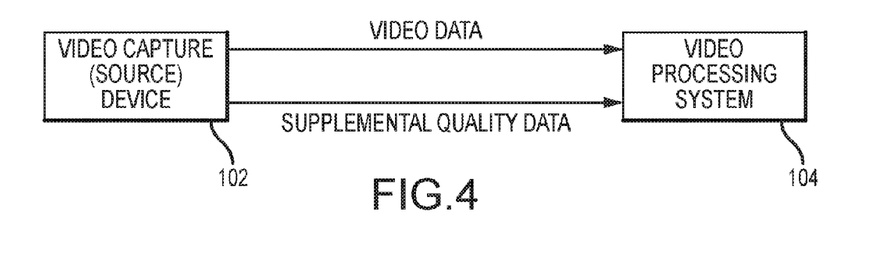

As another example, the source device 102 generates and transmits a supplemental data stream that corresponds to the captured video data, wherein the supplemental data includes or defines the video quality metric or measurement. Thus, the captured video data can be transmitted as-is to a destination component, along with the supplemental quality data. The destination component can then take appropriate action after reviewing the supplemental quality data. FIG. 4 is a diagram that illustrates this scenario. In FIG. 4, a source device 102 transmits the captured video data, along with separate and distinct supplemental data that represents the video quality metric for the captured video data. The video processing system 104 can receive and process the captured video data with the associated supplemental data.

Figure 5:
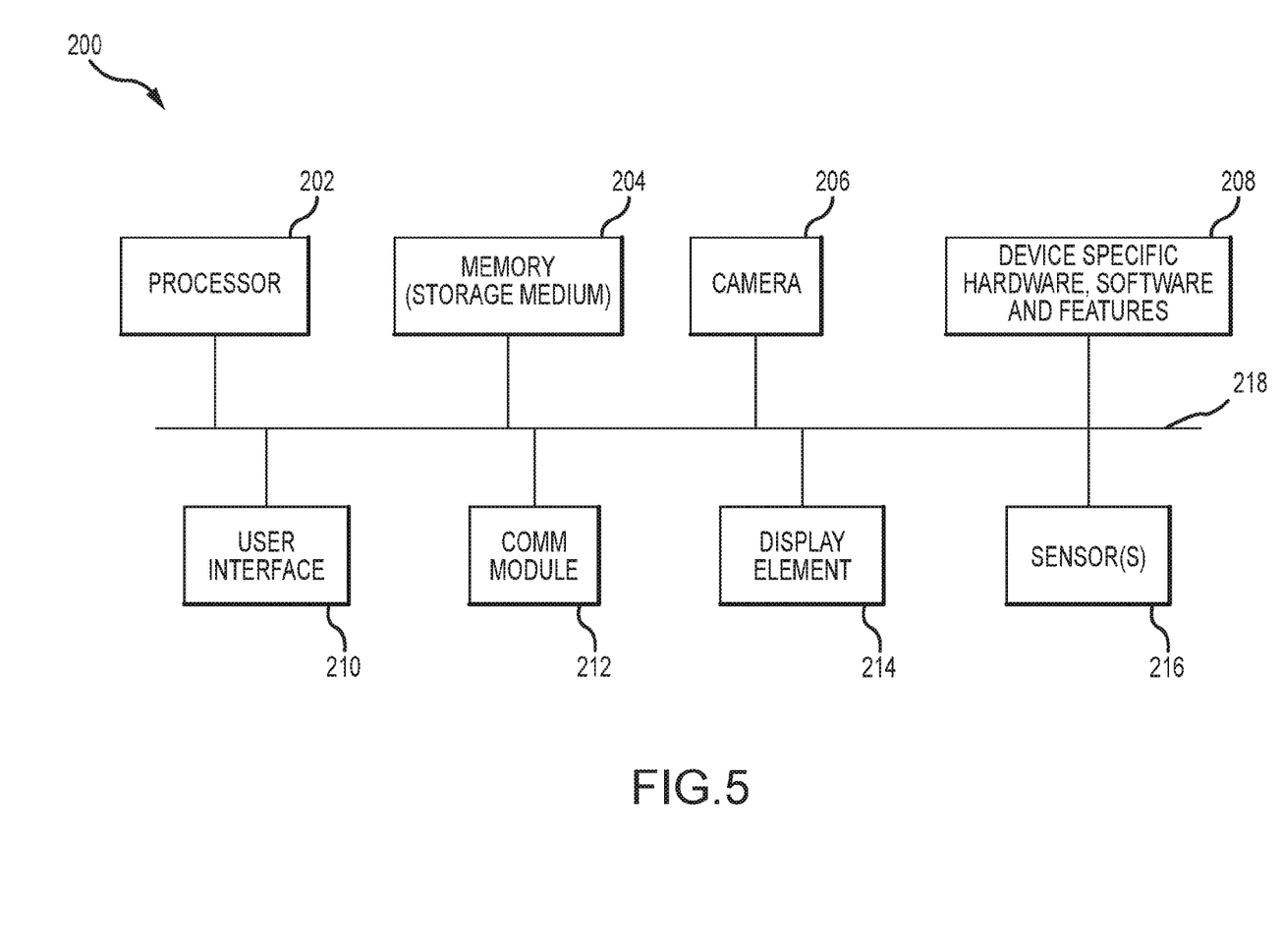
FIG. 5 is a block diagram that represents an exemplary embodiment of an electronic device that can serve as a source of video data.

FIG. 5 is a block diagram that represents an exemplary embodiment of an electronic device 200 that can serve as a source of video data. In this regard, the electronic device 200 can serve as any of the source devices 102 mentioned above. The illustrated embodiment of the electronic device 200 includes, without limitation: at least one processor component 202; a suitable amount of memory 204; a camera 206 configured to capture video data; device-specific hardware, software, firmware, and/or features 208; a user interface 210; a communication module 212; a display element 214; and one or more onboard sensors 216. Of course, the electronic device 200 may include additional elements, components, modules, and functionality configured to support various features that are unrelated to the subject matter described here. For example, the electronic device 200 may include certain features and elements to support conventional functions that might be related to the particular implementation and deployment of the electronic device 200. In practice, the elements of the electronic device 200 may be coupled together via a bus or any suitable interconnection architecture 218.

The processor component 202 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. Moreover, the processor component may be implemented as a combination of computing devices, e.g., a combination of a digital signal processor and a microprocessor, a plurality of microprocessors, one or more microprocessors in conjunction with a digital signal processor core, or any other such configuration.

The memory 204 may be realized as RAM memory, flash memory, EPROM memory, EEPROM memory, registers, a hard disk, a removable disk, a CD-ROM, or any other form of storage medium known in the art. In this regard, the memory 204 can be coupled to the processor component 202 such that the processor component 202 can read information from, and write information to, the memory 204. In the alternative, the memory 204 may be integral to the processor component 202. As an example, the processor component 202 and the memory 204 may reside in an ASIC. At least a portion of the memory 204 can be realized as a computer storage medium, e.g., a tangible computer-readable medium having computer-executable instructions stored thereon. The computer-executable instructions, when read and executed by the processor component 202, cause the electronic device 200 to perform certain tasks, operations, functions, and processes described in more detail herein. In this regard, the memory 204 may represent one suitable implementation of such computer-readable media. Alternatively or additionally, the electronic device 200 could receive and cooperate with computer-readable media (not separately shown) that is realized as a portable or mobile component or platform, e.g., a portable hard drive, a USB flash drive, an optical disc, or the like.

The camera 206 is preferably realized as an integrated element of the electronic device 200. In certain embodiments, however, the camera 206 can be a peripheral component that cooperates with the electronic device 200. The camera 206 can be used to capture video data in any suitable format, which may be compatible with one or more video encoding standards or specifications. Those of ordinary skill in the art will be familiar with the manner in which the camera 206 captures video data, and the particular encoding techniques and standards employed by the electronic device 200 and, therefore, these aspects will not be described in detail here.

The device-specific hardware, software, firmware, and features 208 may vary from one embodiment of the electronic device 200 to another. For example, the device-specific hardware, software, firmware, and features 208 will support telephone functions and features when the electronic device 200 is realized as a mobile telephone, conventional personal computer functions and features if the electronic device 200 is realized as a laptop or tablet computer, etc. In practice, certain portions or aspects of the device-specific hardware, software, firmware, and features 208 may be implemented in one or more of the other blocks depicted in FIG. 2.

The user interface 210 may include or cooperate with various features to allow a user to interact with the electronic device 200. Accordingly, the user interface 210 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the electronic device 200. The user interface 210 may include one or more graphical user interface (GUI) control elements that enable a user to manipulate or otherwise interact with an application via the display element 214.

The communication module 212 facilitates data communication between the electronic device 200 and other components as needed during the operation of the electronic device 200. In the context of this description, the communication module 212 can be employed to transmit or stream captured video data, metadata, supplemental data, signaling or control data, and the like. Referring again to FIG. 1, the communication module 212 enables the electronic device 200 to communicate with the video processing system 104 and/or the presentation devices 106 as needed. In practice, an embodiment of the electronic device 200 may support wireless data communication and/or wired data communication, using various data communication protocols. For example, the communication module 212 could support one or more wireless data communication protocols, techniques, or methodologies, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB. Moreover, the communication module 212 could support one or more wired/cabled data communication protocols, including, without limitation: Ethernet; powerline; home network communication protocols; USB; IEEE 1394 (Firewire); hospital network communication protocols; and proprietary data communication protocols.

The display element 214 is suitably configured to enable the electronic device 200 to render and display various screens, GUIs, GUI control elements, drop down menus, auto-fill fields, text entry fields, message fields, or the like. Of course, the display element 214 may also be utilized for the display of other information during the operation of the electronic device 200, as is well understood. Notably, the specific configuration, operating characteristics, size, resolution, and functionality of the display element 214 can vary depending upon the practical implementation of the electronic device 200. For example, if the electronic device 200 is a laptop computer, then the display element 214 may be a relatively large monitor. Alternatively, if the electronic device 200 is a cellular telephone device, then the display element 214 may be a relatively small integrated display screen, which may be realized as a touch screen.

The electronic device 200 can include at least one onboard sensor 216 that detects, measures, or otherwise obtains status information associated with the state, operation, or condition of the electronic device 200. A given sensor 216 can be used for any particular function, application, or feature of the electronic device 200. Moreover, in certain embodiments, a sensor 216 can be utilized to designate whether or not a captured video segment is of poor, low, or suspect quality. For example, if the sensor 216 detects that the electronic device 200 is being held upside-down, then it can be assumed that the captured video data is undesirable. In practice, the electronic device 200 can include or cooperate with any number of sensors 216. To this end, a sensor 216 may be implemented as any of the following, without limitation: an accelerometer; a gyroscope, a magnetometer, a proximity sensor, a light sensor, a pedometer, a motion sensor, an impact or shock sensor, a mercury switch, or the like. During operation of the electronic device 200, the sensors 216 generate respective sensor data, which in turn can be processed locally by the electronic device 200 and/or provided to a destination component (such as a video processing system) for processing in the manner described in more detail herein.

It should be appreciated that the video processing device 104 and the presentation devices 106 (see FIG. 1) may be implemented in a manner that is fundamentally consistent with that described here with reference to FIG. 5. For example, the video processing system 104 can be realized as a computer-based device or system having a processor component, memory, device specific hardware, software, and features, a user interface, a communication module, and a display element (as described above). Likewise, a presentation device 106 can be realized as described above. Indeed, a presentation device 106 can also serve as a source device 102 in certain scenarios. Accordingly, those familiar with computer-based devices and system architectures will understand how the above description of the electronic device 200 can also apply in an equivalent manner to the video processing system 104 and the presentation devices 106.

Figure 6:
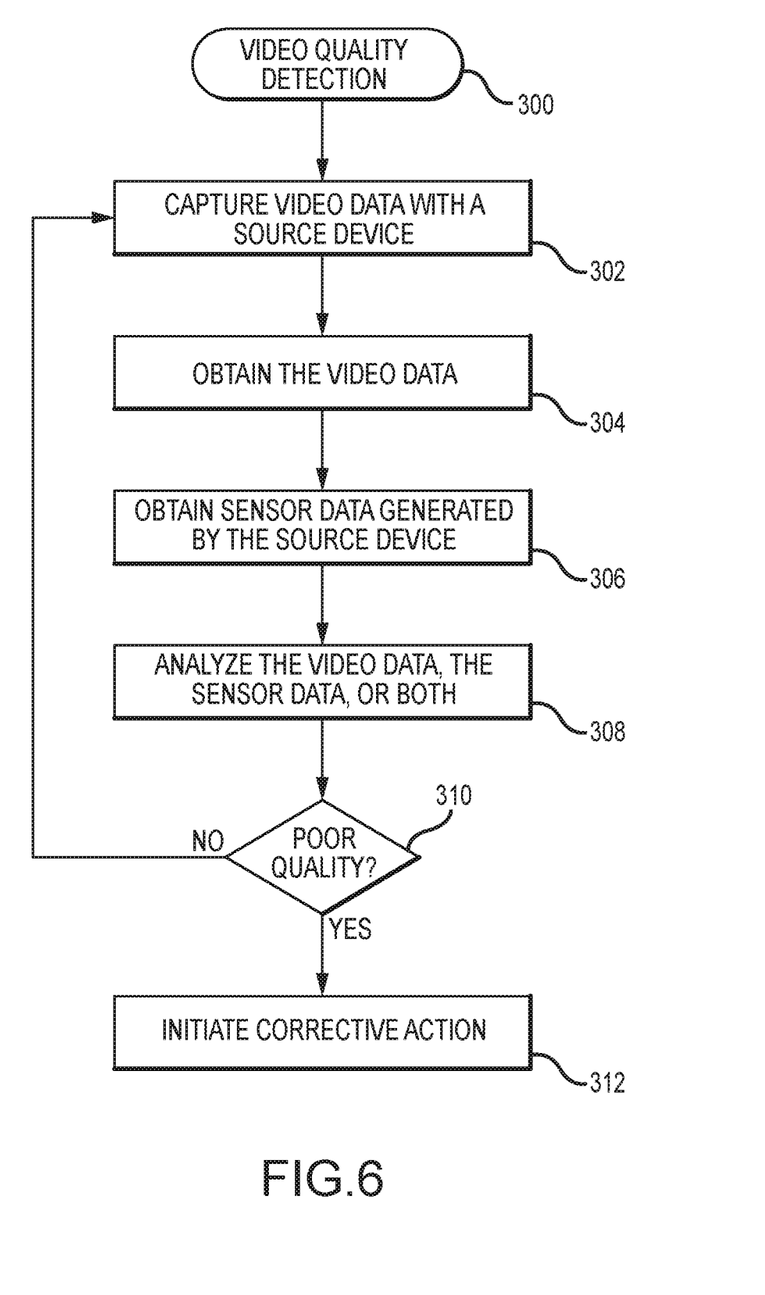
FIG. 6 is a flow chart that illustrates an exemplary embodiment of a video quality detection process.

FIG. 6 is a flow chart that illustrates an exemplary embodiment of a video quality detection process 300. The various tasks performed in connection with the process 300 may be performed by software, hardware, firmware, or any combination thereof. For illustrative purposes, the following description of the process 300 may refer to elements mentioned above in connection with FIGS. 1-5. In practice, portions of the process 300 may be performed by different elements of the described system, e.g., a video source or capture device, a cloud-based video processing system, a presentation device, or the like. It should be appreciated that the process 300 may include any number of additional or alternative tasks, the tasks shown in FIG. 6 need not be performed in the illustrated order, and the process 300 may be incorporated into a more comprehensive procedure or process having additional functionality not described in detail herein. Moreover, one or more of the tasks shown in FIG. 6 could be omitted from an embodiment of the process 300 as long as the intended overall functionality remains intact.

In accordance with the illustrated embodiment of the process 300, a source device is operated to capture video data (task 302). The video data conveys video content that includes frames/images of an event or any subject matter of interest. The video data can be captured in any desired format, at any supported number of frames per second, in interlaced or progressive format, at any supported aspect ratio, and at any supported resolution. Indeed, the captured video data can be compliant with any number of known video compression standards, video display specifications, and video formatting standards. These well-known standards and specifications will not be described in detail here.

In connection with task 302, the source device can record and save the captured video data in local storage media, e.g., solid state memory, a flash memory card, a hard drive, an optical storage disc, magnetic media, or the like. In accordance with some use cases, the source device functions as a video streaming device to transmit the video data (which can be reformatted or encoded as needed to accommodate streaming) to a destination component, such as the cloud-based video processing system 104 described above. The source device can provide the captured video data in real-time, near real-time, or in a time delayed manner, depending on the circumstances.

The process 300 obtains the captured video data (task 304) for purposes of analysis. In accordance with some embodiments, the source device analyzes the video data to determine its quality. In such embodiments, task 304 can obtain the video data immediately after it has been captured, or it can obtain a recorded version of the video data from local storage. Processing the captured video data in real-time or near real-time is desirable to support live streaming applications. In alternative implementations, the captured video data is analyzed by a system, device, or component other than the source device that captured the video data. In such embodiments, task 304 is performed by a destination device, system, or component (such as the video processing system 104 or a presentation device 106) that receives the captured video data directly or indirectly from the source device.

Although not always required, this example assumes that the source device includes one or more onboard sensors 216, as described above with reference to FIG. 5. Moreover, the illustrated embodiment of the process 300 leverages the available sensor data for purposes of determining the video content quality of the captured video data. In this regard, the process 300 obtains at least some of the available sensor data that is generated by the source device (task 306). It should be appreciated that task 306 is optional because a source device need not include any onboard sensors, and because an embodiment of the process 300 can determine the quality of the video data without the benefit of any sensor data. Task 306 and the use of sensor data is described here for the sake of completeness.

The source device initially obtains its onboard sensor data at task 306. In accordance with some embodiments, however, the source device transmits the sensor data or makes the sensor data available to other devices. In this regard, task 306 can be performed by a destination device, system, or component (such as the video processing system 104 or a presentation device 106) that receives the sensor data directly or indirectly from the source device. This allows the destination device or system to analyze the sensor data if needed.

The process 300 continues by analyzing the captured video data, the sensor data, or both the captured video data and the sensor data (task 308) in an effort to determine the quality of the captured video content. More specifically, the process 300 analyzes the available information to determine whether or not the video content that is conveyed by the captured video data satisfies certain predetermined video quality criteria. In certain embodiments, task 308 is intended to detect and identify segments of video content that do not satisfy the desired video quality standards. Notably, the analysis and processing of task 308 can be performed locally by the source device or remotely by a video processing device, a presentation device, or any destination device, system, or component. As another example, the analysis and processing of task 308 can be performed in a distributed manner such that some of the analysis and processing is performed by the source device, and some of the analysis and processing is performed by a different device, system, or component. The following description applies regardless of where the analysis and processing of task 308 takes place.

The captured video data can be analyzed and reviewed to determine whether or not the content is indicative of a "bad" video clip. To this end, the process 300 can leverage any suitable image processing, content recognition, video content analysis, motion recognition, shape recognition, or related techniques or methodologies. The specific technology and methodologies utilized during task 308 may vary from one embodiment to another, and from one captured video stream to another, as appropriate to the particular application, operating scenario, user settings, or the like. The video data can be analyzed to detect movement, transitions, or content that might indicate poor focusing, an unstable camera, an inadvertently captured video segment, or the like. For example, the process 300 can be performed to identify a video segment having one or more of the following detectable characteristics, without limitation: out of focus; erratic camera movement; camera shake; unexpected or abrupt scene transitions (which can be indicative of a dropped or misplaced video capture device); excessively high or low brightness level; excessive video distortion; excessive background noise in the audio track; excessive audio distortion; excessively high or low audio levels; blank screen; dropped frames; little to no detected movement in the video content; abrupt or unexpected changes in the orientation of the video image (which can be indicative of a mishandled video capture device); objects obscuring the primary subject matter; objects on the camera lens (such as water drops, dust, insects, or smudges) or the like.

Additionally or alternatively, the sensor data generated by one or more sensors onboard the video source device can be analyzed and reviewed to determine whether or not the captured video includes any segments of potentially low quality. In this regard, the process 300 can utilize any available sensor output, as mentioned above with reference to the sensors 216 (see FIG. 5). The sensor data can be analyzed to detect movement, conditions, or operating states that might be associated with the capturing of poor quality video. For example, the process 300 can consider any of the following sensor data, without limitation: accelerometer data; gyroscope data; magnetometer data; proximity sensor data; light sensor data; pedometer data; motion sensor data; impact sensor data; shock sensor data; mercury switch status; positioning data from an object of interest; or the like. The process 300 can monitor sensor data of this type to detect conditions that often lead to poor quality video clips. For example, the sensor data can be monitored to detect any or all of the following conditions, without limitation: erratic camera movement; camera shake; dropping or mishandling of the video capture device; excessively high or low ambient light conditions; excessive background noise; improperly oriented or positioned video capture device; abrupt or unexpected changes in the orientation or position of the video capture device; or the like.

If the process 300 determines that a segment of the analyzed video is of poor, undesirable, or otherwise low quality (the "Yes" branch of query task 310), then the process 300 can initiate corrective action (task 312). If the analyzed video content is of acceptable quality (the "No" branch of query task 310), then the process 300 continues in an ongoing manner as described above. In this way, the captured video data can be reviewed in an ongoing manner in real-time, near real-time, or at any time after capture for purposes of evaluating the video quality.

The determination made at query task 310 can be based on one or more measurable, detectable, or obtainable characteristics of the captured video data and/or the obtained sensor data. The specific manner in which the video data and/or the sensor data is analyzed, which characteristics are considered, and the video quality criteria utilized to determine whether or not a given video segment is of potentially low quality can vary from one embodiment to another, and from one captured video stream to another, as appropriate for the given implementation and application. In certain embodiments, the process 300 determines or calculates a video content quality metric based on the analysis performed at task 308. The quality metric can be a score, a value, a flag, a marker, or a quantity that is indicative of the level of "goodness" detected in the segment of video under analysis.

The quality metric can be generated and saved in an ongoing manner, or generated and saved at predetermined time intervals, once every predetermined number of frames, once per video segment (assuming that segments are marked or are detectable), or the like. The quality metric is preferably saved in association with the video data. In practice, the quality metric can be saved as an integral part of the video data, as metadata associated with the video data, as separate and distinct supplemental data that accompanies the video data, or the like. Thus, the quality metric can be used to mark the video data at appropriate locations to identify segments of low quality, or it can be saved in a way that corresponds to the video data (using, for example, time stamp information or other data that correlates with the video data). These and other appropriate methodologies can be leveraged to mark or otherwise identify segments of video content that might be of undesirable quality.

Identifying poor quality video segments is useful when the source device transmits or streams the video data in an ongoing manner to a destination device or system that is responsible for video processing, editing, production, and/or presentation. In such scenarios, the destination device can receive information about the quality of the video data (e.g., a supplemental data stream that points to the video stream, metadata, the quality metric data, or the like) without having to analyze the captured video content or the sensor data.

As mentioned above, if the process determines that a segment of video content does not meet certain predetermined or predefined video quality criteria, then the "Yes" branch of query task 310 is followed such that appropriate action can be initiated. The action taken in response to the detection of a low quality video segment can vary from one embodiment to another, and depending on the particular system architecture. Moreover, the type of action initiated may vary depending on whether the source device or a remote device performed the analysis/detection. In certain situations, task 312 causes the camera associated with the source device to suspend the capturing of the video data. If a system or device other than the source device detects the poor quality video segment, then task 312 may involve the communication of an appropriate control signal or command to the source device—upon receipt of the control signal or command, the source device suspends the video capture operation. The source device may also generate an alert or warning message to let the user know that video recording has been suspended.

In some scenarios, task 312 causes the source device to suspend the transmission or streaming of the captured video data. Suspending the transmission of the captured video data can be performed without suspending or terminating the video capturing operation. Thus, the source device can continue capturing and locally storing the video data even if a potentially low quality segment of video content is detected. If a system or device other than the source device detects the poor quality video segment, then task 312 may involve the communication of an appropriate control signal or command to the source device—upon receipt of the control signal or command, the source device suspends the transmission or streaming of the video data. The source device may also generate an alert or warning message to let the user know that the source device has stopped transmitting the video data.

Referring again to FIG. 1, the video processing system 104 can function as an automated video production facility that receives and processes video feeds from multiple source devices 102, and delivers one or more of the video feeds to the presentation devices 106. In certain embodiments, the corrective action initiated at task 312 involves a notification, control signal, or command to disregard the low quality segment of video content. Accordingly, for this particular example, the video processing system 104 can disregard the low quality video feed and instead concentrate on the remaining video feeds (assuming that they are of satisfactory quality). In accordance with another embodiment, task 312 can instruct the presentation devices 106 to ignore a low quality segment of video content (whether or not that segment is provided to the presentation devices 106). In other words, the corrective action initiated by task 312 can suspend the display of low quality segments of video content.

In accordance with yet another embodiment, the video processing system 104 can utilize a decision algorithm that compares the quality metrics of different video sources for purposes of choosing the best available video stream, regardless of its quality. Thus, the system 104 can be suitably designed to select the "best" video stream even if the objective quality of all of the candidate video streams is suspect. Thus, rather than simply disregarding or discarding video segments that do not satisfy predetermined quality criteria, the system 104 selects and keeps the best available video content.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of processing video information, the method comprising:

obtaining segments of video data captured and streamed by a plurality of source devices, the segments of video data corresponding to the same event or subject of interest;

analyzing sensor data generated by the plurality of source devices, the segments of video data, or both the sensor data and the segments of video data;

determining, for the segments of video data captured and streamed by each of the plurality of source devices, a video content quality metric based on the analyzing;

saving the video content quality metric in association with the segments of video data for each of the plurality of source devices;

suspending transmission of video data from one of the plurality of source devices when the video content quality metric identifies a potentially low quality segment of video content corresponding to the video data, without terminating or suspending video capturing operation at the one of the plurality of source devices;

identifying, from the obtained segments of video data, at least one video segment having acceptable quality; and providing the at least one video segment having acceptable quality to a presentation device.

2. The method of claim 1, wherein the analyzing, the determining, and the saving are performed by the plurality of source devices.

3. The method of claim 1, wherein the sensor data is generated from at least one of an accelerometer, a gyroscope, a magnetometer, a proximity sensor, a light sensor, a pedometer, a motion sensor, an impact sensor, a shock sensor, or a mercury switch.

4. The method of claim 1, wherein the video content quality metric identifies a potentially low quality segment of video content corresponding to the video data.

5. The method of claim 1, further comprising marking the video data with the video content quality metric.

6. The method of claim 1, wherein the video content quality metric is saved as supplemental data corresponding to the video data.

7. The method of claim 1, wherein the video content quality metric is saved as metadata corresponding to the video data.

8. The method of claim 4, further comprising initiating corrective action to disregard the segment of video content when the video content quality metric identifies the potentially low quality segment of video content.

9. The method of claim 8, wherein the corrective action comprises suspending display of the potentially low quality segment of video content.

10. The method of claim 8, wherein the corrective action is determined based on a relative quality measure of a plurality of available video segments.

* * * * *